United States Patent Office 3,488,295
Patented Jan. 6, 1970

3,488,295
PROCESS FOR REGENERATING PALLADIUM CARRIER CATALYSTS FOR USE IN THE MANUFACTURE OF VINYL ACETATE
Kurt Sennewald, Wilhelm Vogt, and Hermann Glaser, Knapsack, near Cologne, Germany, assignors to Knapsack Aktiengesellschaft, Knapsack, near Cologne, Germany, a corporation of Germany
No Drawing. Filed June 13, 1966, Ser. No. 556,923
Claims priority, application Germany, July 9, 1965, K 56,575; Jan. 29, 1966, K 58,280
Int. Cl. B01j 11/04; C07c 67/04
U.S. Cl. 252—413    15 Claims

ABSTRACT OF THE DISCLOSURE

A process for regenerating catalyst used in the manufacture of vinyl acetate by the gas phase reaction of ethylene and acetic acid is shown. The catalyst, which contains metallic palladium deposited on silicic acid carrier, is first treated with either moist chlorine gas or an acid in combination with an oxidant. The resulting catalyst mass is reduced with hydrazine hydrate and then washed with water. The so treated catalyst is then contacted with a 1% to 30% aqueous solution of alkali metal formate or acetate; the solution is decanted and the catalyst is ultimately dried.

---

The present invention relates to a process for regenerating a catalyst for use in the manufacture of vinyl acetate, the catalyst containing metallic palladium and, if desired, copper, silver, gold, ruthenium, rhodium, osmium, iridium or platinum, deposited on silicic acid as the carrier.

It is known that vinyl acetate can be prepared from ethylene, acetic acid, oxygen or air in the gaseous phase in contact with a catalyst formed of silica gel, aluminum oxide, pumice, asbestos, active carbon or similar substances as the carrier, and of metallic palladium, which may be used in combination with activating elements other than palladium, as the active catalyst constituent. These catalysts being very costly, it is of outstanding commercial significance that they produce good space/time yields and that their activity dies down but fairly slowly. However, these catalysts, too, must be regenerated from time to time, the regeneration being intended to restore their initially high space/time yields.

The present invention now provides a process of regenerating a catalyst for use in the manufacture of vinyl acetate, the catalyst containing metallic palladium and, if desired, copper, silver, gold, ruthenium, rhodium, osmium, iridium or platinum, deposited on silicic acid as the carrier, wherein the catalyst to be regenerated is treated by means of an acid and an oxidant or by means of moist chlorine gas, the resulting catalyst mass is treated then with hydrazine hydrate, washed with water, treated subsequently by means of a 1 to 30% aqueous solution of an alkali metal formate or alkali metal acetate, the solution is decanted, and the catalyst mass is dried. For treatment with the hydrazine hydrate, the catalyst mass can be introduced into an aqueous solution of hydrazine hydrate having a temperature of about 35 to 50° C., and the solution is decanted. The treatment by means of the alkali metal formate or alkali metal acetate solution can be achieved e.g. over a period of 1 hour, and the catalyst is finally dried, preferably at a temperature of about 50 to 70° C. under reduced pressure.

The process of the present invention comprises more especially covering the catalyst to be regenerated with a layer e.g. of a 1 to 30% aqueous hydrochloric acid, adding hydrogen peroxide with agitation until the gray-black coloration of the catalyst has changed to yellow-brown, evaporating the whole to dryness and introducing it into the hydrazine hydrate solution. In accordance with the present invention the catalyst to be regenerated can also be subjected to the action of a stream of chlorine gas saturated with steam until the gray-black coloration of the catalyst has changed to yellow-brown, the resulting mass can be freed from excessive chlorine by causing air to travel over it and introduced then into the hydrazine hydrate solution.

It is plausible that the process described herein is applicable only to those catalysts which are deposited on a carrier, such as silicic acid, that substantially or completely withstands the action of acids or chlorine gas. Failing this, it is impossible to regenerate the catalyst per se; all that is possible then is to recover the costly palladium.

Catalysts regenerated in the manner set forth above could not be found to differ from fresh catalysts as regards activity and durability. After repeated regeneration, however, the initial space/time yields were obtainable at constantly decreasing rates, especially when the catalysts had been allowed to become inactive owing to excessively prolonged operation periods. In this event, the catalysts were found to contain increased proportions of carbonaceous products, i.e. organic compounds which poison the catalyst and are insoluble in customary solvents, e.g. in dilute acetic acid or acetone. The chlorination described above and achieved at room temperature, e.g. at about 15 to 30° C., then permitted no longer those disturbing compounds to be removed completely, though the wash water used for washing once the inactive catalysts had been chlorinated and reduced then by means of hydrazine hydrate, was found to contain chlorinated organic compounds.

The present invention now unexpectedly provides a particularly efficient process for regenerating those catalysts for use in the manufacture of vinyl acetate, which comprises washing the catalyst to be regenerated with water, exposing the water-washed catalyst, at an elevated temperature of up to about 500° C., preferably of 100 to 200° C., to the action of a stream of chlorine gas containing steam until the gray-black coloration of the catalyst has turned to yellow-brown, freeing the resulting mass from excessive chlorine by causing air to travel over it, introducing the mass then, in the manner set forth above, into an aqueous solution of hydrazine hydrate, the solution having a temperature of about 35 to 50° C., decanting the hydrazine hydrate solution, washing the mass with water, treating it with a 1 to 30% aqueous alkali metal acetate solution, decanting the alkali metal acetate solution, and ultimately drying the mass at a temperature of about 50 to 70° C. under reduced pressure. The chlorination at "elevated temperatures" is achieved at a temperature above room temperature comprising the range of 15 to 30° C., e.g. at a temperature of at least 31° C. On the other hand, the yellow-brown catalyst mass chlorinated and freed from excessive chlorine can be gassed, at a temperature of about 100 to 200° C., by means of a mixture formed of hydrazine and steam, washed with hot water, treated with the alkali metal acetate solution in the manner set forth above, and dried. The hydrazine/steam mixture may also contain an inert gas, which is preferably nitrogen. The step of gassing with a hydrazine/steam mixture to replace treatment of the catalyst mass with an aqueous solution of hydrazine hydrate can also be used as a convenient operation following the catalyst treatment first described above by means of an acid and an oxidant, e.g. with aqueous hydrochloric acid and hydrogen peroxide.

In accordance with a further feature of the present invention the catalyst to be regenerated is burned off in an oxygen-containing stream of nitrogen at a temperature of about 150 to 500° C. This operation is achieved after washing with water but prior to gassing with steam-containing chlorine or prior to treating the catalyst by means of the acid and the oxidant.

After the water-wash, but prior to the gassing with steam-containing chlorine or the treatment by means of the acid and oxidant, the catalyst to be regenerated can also be burned off in a stream of nitrogen containing oxygen at a temperature above 500° C. up to about 800° C., and the palladium oxide formed can be reduced to metallic palladium by means of an aqueous solution of hydrazine hydrate. The stream of nitrogen should initially contain a slight proportion of oxygen, and it should gradually be replaced with air. This last-mentioned treatment with hydrazine hydrate should not be confounded with the further hydrazine treatment which, as stated above, follows the catalyst treatment achieved by means of the acid and oxidant or by means of the steam-containing chlorine gas.

A regeneration which in all cases restores the initial activity of a fresh catalyst can be achieved when the catalyst, freed from alkali metal acetate by washing with water, is subjected in the manner set forth above to treatment with air, at elevated temperatures, whereby the carbonaceous compounds are caused to undergo combustion. The catalyst so burned off is chlorinated then ($PdCl_2$), reduced with the help of hydrazine (PdO), washed, impregnated with an alkali metal acetate solution, and dried. When the catalyst is burned off at temperatures above 500° C., the metallic palladium (Pd) will be transformed into palladium oxide (PdO) which cannot be chlorinated but must first be reduced to PdO by means of an aqueous solution of hydrazine hydrate. If the catalyst were impregnated at this stage with the alkali metal acetate solution and used then, it would produce no more than about 70% of the initial space/time yield. It is therefore necessary first to chlorinate the partially regenerated catalyst ($PdCl_2$) and reduce it then to PdO by means of hydrazine hydrate.

The following examples illustrate the process of the present invention.

EXAMPLE 1

400 cc. of a catalyst which had been prepared at a temperature of 60° C. by reducing palladium chloride, deposited on silicic acid strands (3 mm. wide; surface: 180 square meters/gram, determined by the BET-method) by means of a mixture formed of sodium formate and formic acid as the reducing agents, and which contained about 6.5% by weight metallic palladium, were introduced into an 18/8 chrome-nickel steel tube having an internal diameter of 25 mm. in which was placed a chrome-nickel steel core tube which had an external diameter of 14 mm. and was intended to receive thermo-resistors for temperature determination. A gas mixture formed of 90 normal liters (measured at N.T.P.) ethylene, 50 normal liters air and 100 grams acetic acid was introduced per hour, under a pressure of 6 atmospheres absolute, into the tube maintained in upright position and at a temperature of 180° C. by means of a liquid bath. The gas mixture leaving the reaction tube was cooled down to −70° C. and the condensed matter was analyzed by distilling it. During the first 10 days, the catalyst was found to produce vinyl acetate in a space/time yield of 20 to 30 grams per liter of catalyst per hour. After having been treated with air and nitrogen, the catalyst produced vinyl acetate in an increased space/time yield averaging 50 grams per liter of catalyst per hour; this was the space/time yield which was obtained during the period commencing with the 10th and ending with the 40th day. On the 57th day of operation, the catalyst activity was found to have dropped to 20 grams vinyl acetate per liter of catalyst per hour, and on the 63rd day it was found to have further decreased to 6 grams vinyl acetate per liter of catalyst per hour. At this stage, where the catalyst is useless for commercial operations, it was removed from the reaction tube to be regenerated in accordance with the present invention.

In a porcelain vessel, the catalyst mass was covered, at room temperature (15 to 30° C.) with a layer of hydrochloric acid of 10% strength. Hydrogen peroxide of 3 to 30% strength was added at room temperature (15 to 30° C.) with agitation; the gray-black mixture of metallic palladium and $SiO_2$ transformed into a yellow-brown mixture of palladium chloride and $SiO_2$. The brightening of the catalyst carrier mass indicated the amount of hydrogen peroxide to be added.

The whole mass was then evaporated to dryness with agitation. The resulting mass was introduced then into a 3% aqueous solution of hydrazine hydrate having a temperature of 40° C., and the $PdCl_2$ adsorbed on the grains was reduced to metallic palladium. The reducing solution was decanted, the whole was water-washed and the granular catalyst was introduced into a 10% aqueous solution of sodium acetate in which it was allowed to remain for 1 hour at room temperature (15 to 30° C.). The sodium acetate solution was decanted and the catalyst mass was dried at 60° C. in a vacuum drying cabinet. The catalyst so regenerated was ready for use. It had an activity the same as the initial catalyst, i.e. of 45 to 50 grams vinyl acetate per liter of catalyst per hour.

EXAMPLE 2

A catalyst which after prolonged use thereof had become inactive was regenerated in the manner set forth below and its initial activity was restored. The inactive catalyst described in Example 1 was placed into a glass tube and moistened chlorine gas was caused to flow therethrough at room temperature (15 to 30° C.). The catalyst or chlorine stream was required to contain some water because palladium is known not to react with dry chlorine. Chlorine saturated with steam at room temperature transformed the Pd to $PdCl_2$ within about 1 hour. The catalyst coloration turned from gray-black to yellow-brown. After the chlorination was complete, the catalyst mass was conveniently freed from residual chlorine by causing air to travel over it, and the catalyst mass was introduced then, in the manner set forth in Example 1, into a solution of hydrazine and a solution of sodium acetate.

The catalyst so regenerated was dried and it was then ready for use. It produced vinyl acetate in a space/time yield of 50 to 60 grams per liter of catalyst per hour. The regenerated catalysts could not be found to differ from fresh catalysts in activity and durability.

EXAMPLE 3

A catalyst which had been prepared at a temperature of 40° C. by reducing palladium chloride and chlorauric acid, deposited on silicic acid strands (3 mm. wide; surface: 180 square meters per gram, determined by the BET-method), by means of a 3% solution of hydrazine hydrate as the reducing agent, and which contained about 1% by weight palladium and 0.04% by weight gold, was impregnated with a 10% solution of sodium acetate and then produced vinyl acetate in a yield of 50 grams per liter of catalyst per hour. After having been used for some weeks, the catalyst had become inactive. It was regenerated then in the manner set forth in Example 2. The regenerated catalyst was used again. It was found to have the following activity during the first 6 days:

| | Grams |
|---|---|
| 1st day | 53 |
| 2nd day | 59 |
| 3rd day | 65.3 |
| 4th day | 76 |
| 5th day | 78.5 |
| 6th day | 82 |

EXAMPLE 4

1 kg. silicic acid in the form of strands 3 mm. wide was mixed with an aqueous solution containing 10.7 grams palladium in the form of $PdCl_2$ and 9 grams gold in the form of $H[AuCl_4]$, and thoroughly impregnated. The whole was dried then with agitation in order uniformly to distribute the noble metal salts on the carrier. The dry mass was slowly introduced at 40° C. into a 3% solution of hydrazine hydrate. The palladium chloride and the chlorauric acid immediately underwent reduction which was accomplished by the evolution of nitrogen. Once the reduction was complete, supernatant water was poured off, the whole was after-washed with distilled water, and the moist catalyst was introduced into an about 10% solution of sodium acetate. Excessive sodium acetate solution was decanted, and the catalyst was dried at 60° C. in vacuo. The catalyst so prepared contained 1.03% by weight Pd, 0.86% by weight Au and 1.8% by weight Na in the form of $CH_3COONa$. The gold content of the catalyst was 30 atom percent, referred to the gram atoms palladium plus gold. The catalyst was ready for use in the absence of any further treatment.

350 cc. of the catalyst mass so prepared were placed into an 18/8 chrome-nickel steel tube having an internal diameter of 25 mm., in which was placed a chrome-nickel steel core tube which had an external diameter of 14 mm. and was intended to receive thermo-resistors for temperature determination, and the catalyst mass was maintained at 170° C. by gentle heating of the tube. A gas mixture formed of 120 grams acetic acid, 90 normal liters (measured at N.T.P.) ethylene and 65 normal liters air was caused then, under a pressure of 6 atmospheres absolute, to travel through the tube maintained in upright position. The gas mixture leaving the reaction tube was cooled down to —70° C. to remove condensable matter, and the condensed matter was analyzed by distilling it. This catalyst produced vinyl acetate in an initial space/time yield of 110 to 120 grams per liter of catalyst per hour.

EXAMPLE 5

After 3 and 6 weeks of operation, respectively, the catalyst described in Example 4 was regenerated once by chlorinating it at room temperature. After catalyst activity had dropped to about 70 grams vinyl acetate per liter of catalyst per hour, the catalyst was water-washed and thus freed from alkali metal acetate and chlorinated then by means of steam-containing chlorine at a temperature of 150 to 180° C. The transformation of PdO and AuO into $PdCl_2$ and $AuCl_3$ was complete after a period of about 1 hour. The coloration of the catalyst changed from gray-black to yellow-brown. Chlorine in excess was expelled by means of air and a mixture of hydrazine and steam, which contained nitrogen as the carrier gas, was caused to travel over the catalyst mass, again at a temperature of 150 to 180° C., to reduce the noble metal chlorides to the metallic state. The reduction was complete within a period of some minutes. The catalyst was washed with hot water, impregnated for about 1 hour by means of a 10% alkali metal acetate solution, dried at 60° C. in vacuo, and used again to serve as a catalyst. The catalyst activity was found to have increased to 104 grams vinyl acetate per liter of catalyst per hour. This method of carrying out the regeneration has proved to be especially advantageous in those cases where the inactive catalyst is not intended to be removed from vinyl acetate furnaces of appropriate design.

EXAMPLE 6

Once the activity of the catalyst regenerated in Example 5 was found to have dropped to 25 grams vinyl acetate per liter of catalyst per hour, the catalyst was water-washed and thus freed from alkali metal salts, and chlorinated then at 100° C. after the chlorination, chlorine in excess was expelled by means of air, and the catalyst was introduced into a 3 to 4% aqueous solution of hydrazine hydrate having a temperature of 40° C. and intended to reduce the noble metal chlorides formed. The reducing solution was decanted after some time, the catalyst was water-washed and impregnated by means of a 10% aqueous solution of sodium acetate which was decanted after 1 hour. The catalyst dried then at 60° C. in a vacuum drying cabinet. As a result of this treatment, the catalyst activity was found to have increased to 70 grams vinyl acetate per liter of catalyst per hour.

EXAMPLE 7

After a further 12 days of operation, the activity of the catalyst described in Example 6 had dropped from 70 grams to 40 grams vinyl acetate per liter of catalyst per hour. In order to remove all of the carbonaceous compounds, the catalyst was water-washed first and thus freed from alkali metal acetate; it was burned-off then by being heated in a stream of air to a temperature of 400 to 500° C. When the carbonaceous compounds started to undergo oxidation, it proved convenient to use nitrogen containing less than 5% by volume oxygen. This permitted obviating too high a combustion temperature. The nitrogen poor in oxygen was gradually replaced with air as the oxygen content increased.

The organic contaminants could also be burned-off at temperatures higher than indicated above, i.e. at temperatures of up to 800° C. However, as temperatures above 500° C. were found to incur the formation of PdO, which cannot directly be transformed into $PdCl_2$ by means of chlorine or hydrochloric acid, it was necessary to reduce the PdO to metallic palladium using an aqueous solution of hydrazine hydrate as the reducing agent.

The catalyst burned-off at a temperature above or below 500° C., which contained all of the noble metals in the metallic state, was gassed at 100° C. with a moist chlorine stream; this resulted in all of the noble metals being transformed into chlorides. The catalyst was then treated further as described in Example 6. The regenerated catalyst again produced vinyl acetate in the initial yield of 110 grams per liter of catalyst per hour.

EXAMPLE 8

1 kg. of a silicic acid carrier in the form of balls 4 mm. wide was impregnated with an aqueous solution containing 8 grams Pd in the form of $PdCl_2$ and 3 grams Au in the form of $H[AuCl_4]$ and dried then with agitation which ensured uniform distribution of the noble metal salts on the carrier. The dry mass was slowly introduced at 40° C. into a 4 to 5% solution of hydrazine hydrate. Once the reduction of the noble metal compounds was complete, supernatant liquid was poured off, the whole was thoroughly after-washed with distilled water, and the moist catalyst was introduced into an about 10% solution of sodium acetate. Excessive sodium acetate solution was decanted, and the catalyst was dried at 60° C. in vacuo. The catalyst so prepared contained about 0.8% by weight Pd, 0.3% by weight Au and about 1.8% by weight Na in the form of $CH_3COONa$.

350 cc. of the catalyst mass so prepared were placed into an 18/8 chrome-nickel steel tube having an internal diameter of 25 mm., in which was placed a chrome-nickel steel core tube which had an external diameter of 14 mm. and was intended to receive thermo-resistors for temperature determination, and the catalyst mass was maintained at 170° C. by gentle heating of the tube. A gas mixture formed of 120 grams acetic acid, 90 normal liters (measured at N.T.P.) ethylene and 65 normal liters air was caused then, under a pressure of 6 atmospheres absolute, to travel through the tube maintained in upright position. The gas mixture leaving the reaction tube was cooled down to —70° C. to remove condensable matter, and the condensate was analyzed by distilling it. This catalyst produced vinyl acetate in an initial space/time yield of 83 grams, which increased within 24 hours to 110 grams to decrease within 17 days of operation to 70 grams vinyl acetate per liter of catalyst per hour. The average daily decrease in activity was determined to be 2.35 grams vinyl acetate per liter of catalyst per hour.

After 17 days, the catalyst was removed from the reactor to be regenerated. To this end, it was washed with water, burned-off in a stream of air as described in Example 7, gassed at 100° C. by means of a moist chlorine stream, reduced in the manner set forth in Example 6 by means of a hydrazine hydrate solution, washed again with water, and impregnated with an 11% solution of potassium acetate and sodium acetate (molar ratio of $CH_3COOK:CH_3COONa=1:1$). The catalyst then contained about 0.8% Pd, 0.3% Au, 0.8% Na in the form of $CH_3COONa$ and 1.5% K in the form of $CH_3COOK$. It produced vinyl acetate in a space/time yield of 120 grams per liter of catalyst per hour. The space/time yield could not be found to have remarkably decreased after 28 days of operation.

We claim:
1. A process for regenerating a catalyst for use in the manufacture of vinyl acetate by the gas phase reaction of ethylene and acetic acid, the catalyst containing metallic palladium deposited on silicic acid as the carrier which comprises: treating the catalyst to be regenerated with a member selected from the group consisting of moist chlorine gas and aqueous hydrochloric acid with hydrogen peroxide, treating the resulting catalyst mass with hydrazine hydrate, washing the said catalyst mass with water and treating it with a 1 to 30% aqueous solution formed of at least one member selected from the group consisting of alkali metal formate and alkali metal acetate, decanting the solution, and ultimately drying the catalyst mass.

2. A process as claimed in claim 1, wherein the catalyst to be regenerated is additionally washed with water and burned-off then at a temperature of 150–500° C. in an oxygen containing stream of nitrogen prior to treatment as recited in claim 1.

3. A process as claimed in claim 1, wherein the catalyst to be regenerated is additionally washed with water and burned-off then at a temperature of above 500° C. up to about 800° C. in an oxygen-containing stream of nitrogen prior to treatment as recited in claim 1, and the resulting palladium oxide is reduced to metallic palladium by means of an aqueous solution of hydrazine hydrate.

4. A process as claimed in claim 2, wherein the stream of nitrogen initially contains a slight proportion of oxygen and is gradually replaced with air.

5. A process as claimed in claim 1, wherein the catalyst to be regenerated is covered with a layer formed of a 1 to 30% aqueous hydrochloric acid, then hydrogen peroxide is added with agitation until the gray-black coloration of the catalyst has changed to yellow-brown, the whole is evaporated to dryness and treated then by means of hydrazine hydrate.

6. A process as claimed in claim 1, wherein the catalyst to be regenerated is exposed, at room temperature and at an elevated temperature, respectively, to the action of a stream of chlorine gas containing steam until the gray-black coloration of the catalyst has changed to yellow-brown, the catalyst mass so treated is freed from chlorine in excess by causing air to flow over it, and treated by means of hydrazine hydrate.

7. A process as claimed in claim 6, wherein the said stream of chlorine gas is saturated with steam.

8. A process as claimed in claim 6, wherein the catalyst to be regenerated is first washed with water and exposed then, at a temperature of up to about 500° C., to the action of the steam-containing chlorine gas stream until the gray-black coloration of the catalyst has changed to yellow-brown.

9. A process as claimed in claim 8, wherein the steam-containing chlorine gas stream has a temperature of 100 to 200° C.

10. A process as claimed in claim 1, wherein the catalyst mass is introduced into an aqueous solution of hydrazine hydrate having a temperature of about 35 to 50° C. for treatment therewith.

11. A process as claimed in claim 1, wherein the catalyst mass is gassed, at a temperature of about 100 to 200° C., with a mixture of hydrazine and steam for treatment therewith, washed with hot water, treated then with an alkali metal acetate solution, and ultimately dried.

12. A process as claimed in claim 11, wherein the mixture formed of hydrazine and steam also contains an inert gas carrier.

13. A process as claimed in claim 12, wherein the inert gas carrier is nitrogen.

14. A process as claimed in claim 1, wherein the catalyst to be regenerated is treated with the said solution of alkali metal formate and alkali metal acetate, respectively, for a period of about 1 hour.

15. A process as claimed in claim 1, wherein the catalyst mass is dried at a temperature of 50 to 70° C. under reduced pressure.

References Cited

UNITED STATES PATENTS

| | | | |
|---|---|---|---|
| 2,857,337 | 10/1958 | Hamilton | 252—472 |
| 2,863,917 | 12/1958 | Rucker | 260—539 |
| 3,016,354 | 1/1962 | Hindin | 252—413 |
| 3,134,732 | 6/1964 | Kearby | 208—140 |
| 3,243,384 | 3/1966 | Raarup et al. | 252—415 |
| 3,277,159 | 10/1966 | Schaeffer | 260—497 |
| 3,300,528 | 1/1967 | Wakasa et al. | 260—497 |

FOREIGN PATENTS

| | | |
|---|---|---|
| 969,018 | 9/1964 | Great Britain. |
| 648,814 | 4/1964 | Belgium. |

DANIEL E. WYMAN, Primary Examiner

P. E. KONOPKA, Assistant Examiner

U.S. Cl. X.R.

252—415, 416; 260—497